V. & M. ALTMAN.
LICENSE NUMBER PLATE.
APPLICATION FILED NOV. 2, 1915.
1,224,056.
Patented Apr. 24, 1917.
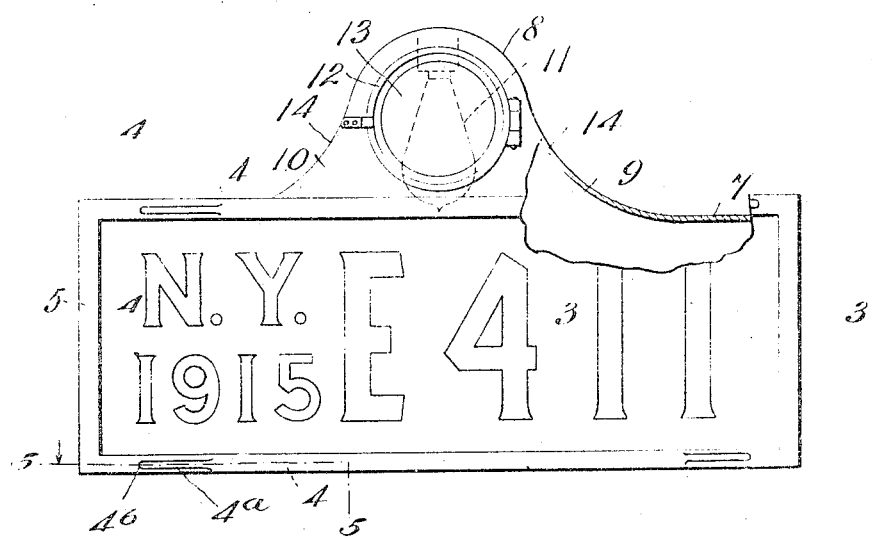
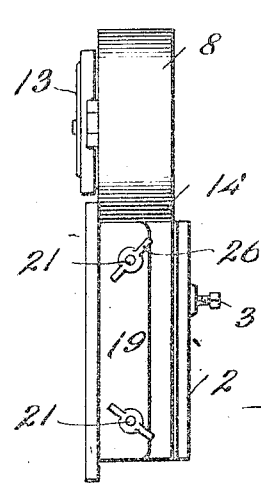
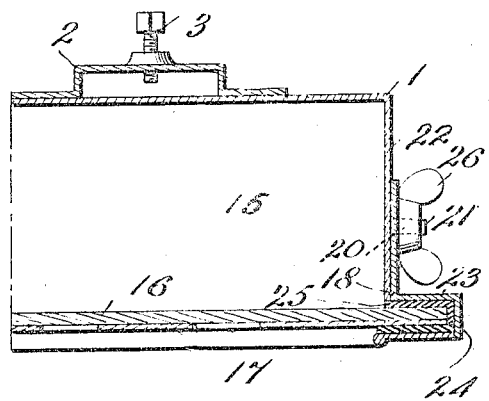
Inventors
Victor Altman and
Michael Altman
By Victor J. Evans
Attorney
Witnesses
Anna V. Doyle

UNITED STATES PATENT OFFICE.

VICTOR ALTMAN, OF BUFFALO, AND MICHAEL ALTMAN, OF ROCHESTER, NEW YORK.

LICENSE-NUMBER PLATE.

1,224,056.　　　　Specification of Letters Patent.　　Patented Apr. 24, 1917.

Application filed November 2, 1915. Serial No. 59,321.

*To all whom it may concern:*

Be it known that we, VICTOR ALTMAN, and MICHAEL ALTMAN, citizens of the United States, residing at Buffalo and Rochester, respectively, in the counties of Erie and Monroe, respectively, and State of New York, have invented new and useful Improvements in License-Number Plates, of which the following is a specification.

This invention relates to automobile license plates and has for its primary object, the provision of means for illuminating the license number to thereby render the same clearly visible for a considerable distance from the vehicle carrying the plate.

A still further object of the invention resides in the provision of a license number plate which will have combined therewith a colored transparent danger signal and a common means for illuminating said signal and the number plate.

Another object of the invention is to provide a device of this character which will consist of a casing open at one side and adapted to receive the number bearing plate and a semi-transparent glass located in front of said open side of the casing and at the back of the number bearing plate and adapted to cause the number and other license data of the plate to be made prominent and clearly visible and means for maintaining a fixed condition of the mentioned plate and glass upon the casing and for guarding the glass against accidental breakage incident to the many shocks and jars which are taken up by the vehicle.

Another object of the invention is to provide a combined number plate and tail lamp in a single article and to construct the device whereby it is rendered strong and durable; one which will be extremely simple of construction and capable of being manufactured at a relatively low cost, and one which will be designed to interchangeably accommodate license plates of a stock character.

In the drawings forming a part of this specification and in which like reference numerals indicate similar parts in the several views:—

Figure 1 is an elevation of the license plate with parts in section.

Fig. 2 is an end view thereof.

Fig. 3 is a section on the line 3—3 of Fig. 1.

Fig. 4 is a section on the line 4—4 of Fig. 1.

Fig. 5 is a section taken on line 5—5 of Fig. 1.

The license plate or device is designed particularly for use upon automobiles or like vehicles where it is a State requirement that the license number of the vehicle be attached to the same and exposed therefrom. It is our primary object to provide a structure of the above character which will consist of an ordinary signal or tail lamp having combined therewith a stencil plate bearing the State license number and data and arranged whereby both the tail lamp and license data will be effectually illuminated and made clearly visible to the eye at remote distances from the vehicle carrying the device.

In order to accomplish the above end, we provide a metallic casing or container 1, having clamps 2 secured to its back wall and adapted to be connected with fixed receiving brackets, not shown, which may be carried by the vehicle. The clamps are provided with set screws 3 adapted to be connected with the supporting brackets so as to hold the device in an operative position.

The container or casing 1, is provided with an open side and the upper and lower walls of the container are upstruck to form longitudinal guide channels 4, while one of the end walls is upstruck to form a similar channel 5 disposed in the direct path of movement of the license carrying element to be hereinafter described. All of these channels are faced by rubber sheeting 6, having the office of a cushion to protect the transparent plate at the back of the number carrying element.

The top wall 7 of the container is provided at its center with a vertically rising branch 8 associated with walls 9 and 10 so as to define therewith a subcompartment containing an illuminating device such as the electric lamp 11 shown in Fig. 1. In front of the lamp the wall 10 is provided with a swinging door 12 which carries a red signaling glass 13 which may be illuminated when the lamp 11 is lighted. The said wall 7 is provided with curved side branches 14—14 whose inner surfaces are preferably mirrored for the purpose of causing the light rays to be evenly distributed throughout the main compartment 15 of said container. Removably mounted in the longitudinal guides 4—4 is a transparent glass plate 16 which is disposed directly at the back of a stencil plate 17 upon which the license number and other data are arranged. The plate 17 is constructed of metal and is of a size uniformly agreeing with that of the transparent plate 16 so that both the transparent plate 16 and said stencil plate 17 can be operatively extended into the guide channels 4—4 in a single operation. The channel 5 has its walls disposed in the direct path of insertion of the plates 16 and 17 so as to form a stop therefor.

In order that the plates 16 and 17 may be securely confined over the open side of the container, we provide a clamp and retainer 18 which is in the form of a metallic plate having an attaching flange 19 in which openings 20 are formed to receive threaded studs 21 which extend from the end wall 22 of the container. The glass plate 16 and the stencil plate 17 normally extend beyond one end of the container and at such end the attaching flange 19 is offset at 23 and then provided with an extension 24. The said portions 23 and 24 are faced with sheet cushioning material 25 such as rubber similar to that described as being provided in the channels 4—4 and 5. Incident to the fact that the said plates 16 and 17 extend beyond one end of the container 1, it follows, that the portion 24 may be adjusted with relation to said plates and the latter securely mounted into the mentioned channels 4—4 and 5 as will be understood.

The studs 21 are provided with winged nuts 26 which are adjustable against the attaching flange 19 so as to effect the desired movement of the portion 24 relatively of the adjacent ends of the said plates 16 and 17.

The device, as described is such that the license plate may be illuminated when the lamp 11 is lighted and the State license number and data thereby rendered clearly visible. The peculiar manner of combining the main compartment 15 with the described auxiliary branch compartment, furnishes a means whereby the license number and the signaling glass 13 will be illuminated through a common means as will be understood.

The flanges 4—4 are slit on longitudinal lines $4^a$ and transversely as at $4^b$ and that portion of the metal between said slits is pressed inwardly against the facing strip and said portions thus serve as springs which freely operate to permit the glass to vibrate to a desirable extent without breaking.

What is claimed as new is:—

A device of the character described comprising a casing open at one side and provided with a compartment, the compartment having spaced longitudinal channels, a vertical channel, cushioning means within said casing, a transparent plate movable in said channels, a plate of the same size as that of the transparent plate and provided with a cut-out indicia, the said plates being extended beyond one end of the casing, and adjustable clamping means removably fitting on the casing and provided with rough surfaces adapted to embrace the adjacent surfaces of said plates at a point where they extend beyond the end of the casing, the said adjustable means serving to operatively confine the edges of said plates in said casing, and spring portions struck up from the walls of the longitudinal channels substantially as and for the purposes specified.

In testimony whereof I affix my signature in presence of two witnesses.

VICTOR ALTMAN.

Witnesses:
   S. F. DRESCHER,
   HAROLD J. SAMUELS.

In testimony whereof I affix my signature in presence of two witnesses.

MICHAEL ALTMAN.

Witnesses:
   LOUIS HARAWITZ,
   H. EGAR.